(12) United States Patent
Ruck et al.

(10) Patent No.: US 9,851,197 B2
(45) Date of Patent: Dec. 26, 2017

(54) DEVICE WITH DISPLACEABLE DEVICE PART, IN PARTICULAR COORDINATE MEASURING DEVICE OR MACHINE TOOL

(71) Applicant: CARL ZEISS INDUSTRIELLE MESSTECHNIK GMBH, Oberkochen (DE)

(72) Inventors: Otto Ruck, Pfahlheim (DE); Peter Uhl, Unterschneidheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 171 days.

(21) Appl. No.: 14/652,186

(22) PCT Filed: Dec. 13, 2012

(86) PCT No.: PCT/EP2012/075460
§ 371 (c)(1),
(2) Date: Jun. 15, 2015

(87) PCT Pub. No.: WO2014/090318
PCT Pub. Date: Jun. 19, 2014

(65) Prior Publication Data
US 2015/0323307 A1    Nov. 12, 2015

(51) Int. Cl.
*G01B 11/00* (2006.01)
*G01B 21/04* (2006.01)
(Continued)

(52) U.S. Cl.
CPC .......... *G01B 11/005* (2013.01); *G01B 11/024* (2013.01); *G01B 21/047* (2013.01); *G01D 5/34746* (2013.01)

(58) Field of Classification Search
CPC .. G01B 11/005; G01B 11/024; G01B 21/047; G01D 5/34746
(Continued)

(56) References Cited

U.S. PATENT DOCUMENTS 4,983,828 A    1/1991  Stephens
6,246,050 B1   6/2001  Tullis et al.
(Continued)

FOREIGN PATENT DOCUMENTS

CN    101389446 A    3/2009
CN    102625918 A    8/2012
(Continued)

*Primary Examiner* — Yaritza Guadalupe-McCall
(74) *Attorney, Agent, or Firm* — Laurence A. Greenberg; Wener H. Stemer; Ralph E. Locher (57) ABSTRACT

A device has a displaceable device part, a drive, which is configured to drive the displaceable device part and to thus induce a movement in the displaceable device part, and a control unit, which is connected to the drive and is configured to control the drive. The device further has a first signal transmitter for determining a position and/or speed of the displaceable device part. The first signal transmitter and/or a first signal evaluation device, which is connected to the signal transmitter, are connected to the control unit such that the control unit receives information from the signal transmitter about the position and/or speed of the displaceable device part during operation of the device and controls the drive on the basis of the information received. A second signal transmitter of the device serves to monitor and/or redundantly determine the position and/or speed of the displaceable device part.

12 Claims, 5 Drawing Sheets

(51) Int. Cl.
*G01B 11/02* (2006.01)
*G01D 5/347* (2006.01)

(58) Field of Classification Search
USPC .......................................................... 33/503
See application file for complete search history.

(56) References Cited

U.S. PATENT DOCUMENTS

| | | |
|---|---|---|
| 6,642,506 B1 | 11/2003 | Nahum et al. |
| 8,103,153 B2 | 1/2012 | Uhl et al. |
| 9,476,688 B2* | 10/2016 | Matzkovits .......... G01B 5/0014 |
| 2001/0013177 A1 | 8/2001 | Jacobs et al. |
| 2004/0238725 A1 | 12/2004 | Ornellas et al. |
| 2007/0246646 A1 | 10/2007 | Lum et al. |
| 2009/0051933 A1 | 2/2009 | Stimpson et al. |
| 2013/0041497 A1* | 2/2013 | Schon ................. G01B 21/047 700/186 |
| 2015/0323307 A1* | 11/2015 | Ruck .................... G01B 21/047 33/503 |
| 2016/0025559 A1 | 1/2016 | Utukuri et al. |

FOREIGN PATENT DOCUMENTS

| | | |
|---|---|---|
| DE | 4303162 A1 | 8/1994 |
| DE | 102006009181 A1 | 9/2007 |
| EP | 1037020 A2 | 9/2000 |
| EP | 1160538 A1 | 12/2001 |
| WO | 8707944 A1 | 12/1987 |
| WO | 2007098886 A1 | 9/2007 |

* cited by examiner

DEVICE WITH DISPLACEABLE DEVICE PART, IN PARTICULAR COORDINATE MEASURING DEVICE OR MACHINE TOOL

BACKGROUND OF THE INVENTION

Field of the Invention

The invention relates to a device having a displaceable device part, in particular a coordinate measuring device (CMD) or machine tool. A displacement of the device part is driven by a drive, wherein a control unit is connected to the drive to control the drive. The invention furthermore relates to a method for operating the device.

Coordinate measuring devices in which a coordinate measuring component (in particular a measuring head) is displaced due to a displacement of the displaceable device part are generally known, e.g. from US 2001/013177 A1. However, the invention is not limited to a specific type of CMD or coordinate measuring component (e.g. sensing measurement head of the switching or non-switching type).

The displaceable device part and therefore e.g. the coordinate measuring component of a CMD or the workpiece-processing tool of a machine tool is movable e.g. in a straight line. Alternatively or additionally, the displaceable part is e.g. rotatable. It is furthermore possible for e.g. the coordinate measuring component or the processing tool to be movable along a plurality of axes of movement (e.g. three exes running perpendicular to one another). In this case, in particular, a plurality of displaceable device parts may be present which are in each case displaceable in the direction of one of the axes of movement and/or around one of, in particular, a plurality of axes of rotation.

In the measurement of the coordinates of measurement objects with displaceable coordinate measuring components and also in the processing of workpieces with processing tools, precautionary measures, in particular, are to be taken. On the one hand, the measurement object/workpiece itself is to be protected against mechanical damage which might occur when contact is made with the coordinate measuring component or the processing tool. On the other hand, persons and parts of the device and its surroundings are also to be protected against mechanical damage of this type. In particular, the speed and/or change of position of the coordinate measuring component or the tool must therefore be monitored in a safe, i.e. in particular a failsafe, manner. A monitoring is understood in particular to mean a procedure that goes beyond the determination of the speed and/or change of position and beyond the use of this information for the drive. In this sense, a monitoring is therefore not involved if, for example, the speed is determined (e.g. through evaluation of the tacho signal of a drive control unit or regulator) and the information relating to the determined speed is used merely to set or regulate the speed (e.g. through comparison with a speed reference value). Instead, a monitoring is understood to mean, in particular, that indicators for unwanted external influences or dangerous situations are determined from the determined speed and/or change of position. The aim of the monitoring is e.g. the detection or avoidance of malfunctions of the device and/or the prevention of risks to persons in the vicinity of the device. The standards IEC 61508/IEC 61511 relate to the safety integrity level SIL, which is determined by a hazard rating.

The monitoring may, in particular, result in a safeguard measure that goes beyond the normal operation of the device. The safeguard measure is e.g. the generation of an error signal and/or a warning signal. Alternatively or additionally, for example, a predefined operating condition of the drive and/or the displaceable part can be set. For example, the drive can be stopped within the shortest possible time period following the triggering of the safeguard measure or the displaceable part can be displaced into a predefined position.

Along with the determination of the speed level, the monitoring can also be geared towards determining the exceeding of a maximum permissible speed, the reaching of a predefined position by the displaceable device part and/or the stopping of the displaceable device part. Determination of a change of position is therefore also understood to mean that the position has changed in such a way that the predefined position is achieved.

It is customary to determine the position of the displaceable part by means of a position signal transmitter, wherein the signal is e.g. an incremental or absolute measurement signal. The position signal is transmitted to the control unit of the device or alternatively, insofar as a separate control unit of the drive of the displaceable device part is provided, to this control unit. The control unit can acquire further information, e.g. the displacement path and/or the displacement speed, through processing of the received signals. In particular, the control unit can control and/or regulate the displacement of the device part according to a specification using the position signals.

If only one signal transmitter which measures the position and/or speed of the displaceable device part is provided, a plausibility check can be carried out on the signals and a safeguard measure can be carried out even in the case of implausible signals. In this case, however, the safety level is low.

It is known from WO 2007/098886 for the speed of the coordinate measuring component of a CMD to be calculated and/or determined in each case from two different, mutually independent signal sources, wherein both signal sources are furthermore used for the operation of the coordinate measuring device.

By means of such a redundant acquisition of information relating to the position and/or speed of the displaceable device part, a substantially more accurate check, in particular, can be implemented and/or safeguard measures can be implemented redundantly via separate information processing chains and separate signal transmission paths, for example, a safeguard measure can be undertaken even if only the signals generated by one of the signal transmitters satisfy a predefined condition (e.g. exceeding of the maximum permissible speed).

BRIEF SUMMARY OF THE INVENTION

One object of the present invention is to indicate a device with a displaceable device part and a method for operating the device which enable a monitoring of the device with little additional requirement for the technical equipment or for the processing of acquired measurement signals. In particular, the correct function of a signal transmitter is intended to be detectable in a simple manner.

According to one essential idea of the present invention, a signal transmitter unit is used or a signal transmitter unit of this type is provided as part of the device, wherein the unit has a radiation source, a matrix of radiation-sensitive detector elements and a signal processor for processing detector signals of the detector elements. In particular, the aforementioned components of the signal transmitter unit and optionally further components are prefabricated and form an integral unit which can thus be mounted on the device in a simple manner. In particular, a retrofitting of existing devices is therefore also possible in a simple manner.

Radiation which is generated by the radiation source can be radiated onto an element of the device which is displaceable in relation to the signal transmitter unit, so that the detector signals are generated depending on the relative position. In addition, the signal processor can process and prepare the generated detector signals of the unit and/or provide them with additional information. The output signals generated by the signal processor of the unit are available to further components of the device, in particular a central control unit of the device, for controlling at least a drive and/or a monitoring device to monitor the device operation. In particular, the central control unit can also be designed as the monitoring device.

Since the radiation source and the matrix of radiation-sensitive detector elements are part of a common unit, they can be aligned with one another in an optimum manner. This applies in particular to the type of the generated radiation (in particular electromagnetic radiation, e.g. visible light and/or electromagnetic radiation in the infrared wavelength range) and in terms of the radiation intensity, the spatial distribution of the radiation intensity and the radiated area of the element displaceable in relation to the unit or the solid angle at which the radiation source emits radiation. Furthermore, the signal processor can be aligned in an optimum manner with the matrix of the radiation-sensitive detector elements, in particular with the number of detector elements and the value range in which the detector signals of the detector elements can vary. In particular, the processing power of the signal processor is therefore precisely aligned with the matrix and optionally also with the radiation from the radiation source which, where appropriate, jointly defines the value range of the possible detector signals. In particular, the signal transmitter unit can be designed for a predefined distance between the unit and the element of the device displaceable in relation to the unit. If a surface of the element is located at the predefined distance from the unit, a surface area of the unit is detected accordingly by the matrix of radiation-sensitive detector elements with a predefined size and a predefined local resolution.

This enables e.g. predefined structures of the element displaceable in relation to the unit to be detected particularly reliably. For example, the signal processor can be programmed or designed in such a way that it generates and outputs a predefined signal on detecting a predefined structure on the surface of the element. As a result, a predefined position of the unit in relation to the displaceable element can be particularly reliably detected. Other components of the device, in particular the central control unit, are not substantially burdened in this part with the evaluation and recognition of the condition. It/they must simply recognize the predefined output signal of the signal processor which signals the presence of the condition. However, the same also applies accordingly to other information that can be derived from the detector signals of the matrix and to their removal, i.e. the recognition and/or processing of this information for which the signal processor is designed. For example, a predefined operating condition may be the stopping of the displaceable device part, i.e. no relative displacement takes place between the signal transmitter unit and the element of the device displaceable in relation thereto. The predefined distance between the signal transmitter unit and the displaceable element does not even have to be maintained for the recognition of this operating condition, or this distance may vary, at least within certain limits. Another example of a predefined operating condition is the exceeding of a maximum permissible speed of the relative displacement of the unit and the element. As mentioned, the signal processor can generate a corresponding predefined output signal in all cases in which the unit recognizes a predefined operating condition of the device.

The displaceable device part of the device is capable of performing a displacement in relation to the surroundings of the device. The aforementioned displaceable element of the device may be this displaceable device part or an element, the displacement of which is similarly performed in relation to the surroundings and is uniquely defined by the displacement of the displaceable device part. For example, the displaceable device part and the displaceable element may be coupled to one another via a transmission and/or a lever. However, the signal transmitter unit may alternatively be connected to the displaceable device part or an element coupled to it and the element displaceable in relation to the signal transmitter unit may be motionless in relation to the surroundings. It is furthermore possible for both the displaceable device part to which the signal transmitter is connected or coupled and the element displaceable in relation to the signal transmitter unit to be displaceable in relation to the surroundings of the device. This is the case, for example, if a plurality of displaceable device parts of the device are present which are in turn displaceable in relation to one another. One example of this is a conventional coordinate measuring device in a portal design with three axes of movement which are in each case positioned in pairs perpendicular to one another.

In particular, the signal transmitter unit may be a unit of a commercially available optical computer mouse. For example, corresponding signal transmitter units for computer mouses can be purchased from Avago Technologies, San Jose, Calif., USA, e.g. under the type designations ADNS-9500 or ADNS-3080.

The matrix of radiation-sensitive detector elements is preferably a two-dimensional matrix with detector elements disposed in rows and columns. However, it is also possible to use a matrix with only one row or one column of detector elements. The matrix therefore records one-dimensional or two-dimensional images of the surface of the displaceable element.

The matrix can also be referred to as a camera and is, in particular, a CCD camera or CCD sensor. For example, 15-30 rows and 15-30 columns of detector elements are sufficient for the use in a signal transmitter unit of the present invention. The group of detector signals generated by the matrix at a specific time therefore corresponds to digital image data of an image of a surface area of the element displaceable in relation to the signal transmitter unit. In the case of a matrix of 30×30 detector elements, for example, images with 30×30 pixels are produced. The recording of images of the surface of the displaceable element is preferably regularly repeated, for example at an image-recording frequency in the kilohertz range, e.g. in the range from 1 to 6 kHz. The signal processor and/or the control unit can determine, in particular, the speed of the relative displacement of the signal transmitter unit and the displaceable element from such a sequence of images.

In particular, the signal transmitter unit furthermore has an optical lens system which may consist, in particular, of two system parts. One part directs the radiation generated by the radiation source onto the surface area of the displaceable element that is to be recorded or directs the radiation at the corresponding spatial angle at which the surface area is located from the perspective of the radiation source. The other part maps the surface area onto the matrix and therefore onto the detector elements.

In particular, a device, in particular a coordinate measuring device or machine tool, is proposed, wherein the device has:
- a displaceable device part by means of which, in particular, a coordinate measuring component of the coordinate measuring device or a tool of the machine tool is displaceable,
- a drive which is designed to drive the displaceable device part and thereby effect a displacement of the displaceable device part,
- a control unit which is connected to the drive and is designed to control the drive,
- a first signal transmitter to determine a position and/or speed of the displaceable device part, wherein the first signal transmitter and/or a first signal evaluation device connected to the first signal transmitter is connected to the control unit so that, during the operation of the device, the control unit receives information from the first signal transmitter relating to the position and/or speed of the displaceable device part and controls the drive depending on the information received,
- a second signal transmitter to check and/or redundantly determine the position and/or speed of the displaceable device part,
- a monitoring device which is designed to recognize an error of the device and/or a disruption to the operation of the device, taking account of signals of the second signal transmitter and/or information derived therefrom, wherein
- the second signal transmitter has a signal transmitter unit which has a radiation source, a matrix of radiation-sensitive detector elements and a signal processor for processing detector signals of the detector elements,
- the radiation source is designed to radiate radiation onto an element of the device displaceable in relation to the signal transmitter unit so that the matrix generates the detector signals depending on the relative position of the signal transmitter unit and the displaceable element, and
- the monitoring component is connected directly or indirectly via at least one further component of the device to the signal processor.

As mentioned, the displaceable device part is, in particular, a device part which is displaceable in a straight line in the direction of an axis of movement. For example, in the case of a coordinate device in a portal design, the displaceable device part, in particular the portal, may therefore be a slide displaceable crosswise to the supports or pillars of the portal, or a sleeve displaceable in relation to the slide. In this case, the coordinate measuring device (e.g. a measurement head with a stylus for the mechanical touching on a workpiece) is attached at the lower end of the sleeve. Other structural forms of coordinate measuring devices with one or more displaceable device parts are known from the prior art.

The control unit may be a central control unit of the device which controls, in particular, the displacement of all displaceable device parts and/or controls at least the displacement of a displaceable device part according to the specifications of the user and/or other specifications for the displacement that is to be performed. The control unit can access at least the signals of the first signal transmitter, wherein the signals can optionally be processed in advance, e.g. in order to determine the position and/or speed from the signals of an incremental value encoder. This preprocessing may be carried out e.g. by a unit of the first signal transmitter. The control unit does not necessarily have to be implemented by means of a module belonging to an integral unit. Instead, the individual modules (such as e.g. the data storage devices, transceiver unit for transmitting data, data processor) can also be implemented in a distributed manner over the device. It is furthermore possible for e.g. a plurality of data storage devices and/or a plurality of data processors to be provided which belong to the control unit. Moreover, it is possible for additional control units and/or regulators to be provided for the performance of the displacement predefined by the central control unit.

As already described, the first signal transmitter is designed, in particular, e.g. as an incremental value encoder. The signals generated by it are connected to a first signal evaluation device and/or directly to the control unit of the device. In this way, the control unit obtains information relating to the position and/or speed of the displaceable device part directly or indirectly via the first signal evaluation device and can control the drive of the displaceable device part depending on the received information.

The radiation source preferably has at least one light emitting diode (LED). Alternatively, other radiation sources, such as e.g. sources of electroluminescent radiation, can be used. A further design of the radiation source has at least one laser diode.

The radiation intensity (i.e. the radiation flux density distribution) generated by the radiation source is preferably variable, preferably by a control unit of the signal transmitter unit which can be implemented, in particular, using the same data processor which also forms the signal processor.

The monitoring device is connected to the signal processor directly or indirectly via at least one further component of the device. Optionally, the monitoring component is also connected to the first signal transmitter or the first signal evaluation component or to the control unit, so that the monitoring component in each case receives information relating to the position and/or speed of the displaceable device part not only from the second signal transmitter, but also from the first signal transmitter. The monitoring component and the control unit of the device can also be implemented by means of the same unit, e.g. the same data processor. In particular, as described above, the monitoring device can be designed to carry out a safeguard measure if a predefined condition is satisfied.

A method for operating a device is furthermore proposed, wherein:
- a position and/or speed of a displaceable device part is detected by a first signal transmitter,
- signals of the first signal transmitter are transmitted to a control unit of the device and the control unit controls a drive of the device part depending on the information relating to the position and/or speed of the displaceable device part received by means of the signals of the first signal transmitter,
- the position and/or speed of the displaceable device part is detected by a second signal transmitter;
- an error of the device and/or a disruption to the operation of the device is recognized taking account of output signals of the second signal transmitter and/or information derived therefrom, wherein
- the second signal transmitter is operated as a signal transmitter unit, with a radiation source, a matrix of radiation-sensitive detector elements and a signal processor, radiation is generated by the radiation source of the signal transmitter unit and is radiated onto an element of the device displaceable in relation to the signal transmitter unit, so that the matrix detects a part of the generated radiation depending on the relative position of the signal transmitter unit and the displaceable element, and the detector signals of the matrix within the signal transmitter unit are transmitted to the signal processor which outputs the output signals of the second signal transmitter, the output signals of the second signal transmitter are evaluated and, where appropriate, an error of the device and/or a disruption to the operation of the device are recognized by means of the evaluation.

In particular, an error of the device can be recognized if the signals generated by the signal transmitter unit and therefore by the second signal transmitter indicate an exceeding of a maximum permissible speed and/or contain information indicating that the displacement predefined by the control unit of the device does not take place or takes place in a different manner. In the last-mentioned case, the cause of the not performed or differently performed displacement may lie in the fact that the operation of the device is disrupted from outside, e.g. by an obstacle (e.g. an object or a part of the body of a person).

As already mentioned, the use of the second signal transmitter in the form of the signal transmitter unit results in an increased operational reliability. The reliability can be further increased by checking the correct function of the signal transmitter unit. For this purpose, designs and functions of the signal transmitter unit are described below which can be implemented individually or in any given combination with one another. This shows that the alignment of the components of the signal transmitter unit, i.e. the radiation source, matrix and signal processor and optionally the controller of the radiation intensity of the radiation source, is advantageous and, in particular, does not additionally burden the control unit of the device.

In particular, the signal transmitter unit and the displaceable element of the device can be displaceable in a linear direction of displacement in relation to one another, wherein the matrix of radiation-sensitive detector elements is a two-dimensional matrix which has a matrix plane in which the detector elements are disposed one behind the other in a row direction and a column direction of the matrix plane, and wherein a parallel projection of the linear direction of displacement onto the matrix plane defines a straight line in the matrix plane which intersects the row direction and the column direction at a narrow angle. In one embodiment of the method, the signal transmitter unit and the displaceable element of the device are displaced in a linear direction of displacement in relation to one another and the matrix of radiation-sensitive detector elements is operated as a two-dimensional matrix.

In particular, the straight line in the matrix plane can intersect the row direction and the column direction at equally wide angles, i.e. in particular at an angle in each case of 45°, if the row direction and the column direction are perpendicular to one another. In this case, the relative speed of the signal transmitter unit and the displaceable element measured in respect of the row direction is as high as the relative speed measured in respect of the column direction. If different speeds are therefore determined in respect of the column direction and in respect of the row direction, this indicates a malfunction, e.g. a malfunction of the matrix of detector elements or a malfunction of the signal processor.

However, the invention is not limited to the alignment at equally wide angles between the straight line and the row direction or the column direction. Instead, even in the case of a different alignment of the straight line, the signal processor can, through simple multiplication by a constant factor, also convert the speed component determined in the column direction and the speed component determined in the row direction into one another and can therefore compare them with one another. The ratio of the two speed components can also be formed and a check can be carried out in order to determine whether this matches a predefined constant factor according to the alignment of the straight line. In the event of deviations from the expected result, an indication of a malfunction is again present. A further possible reason for a functional error of the signal transmitter unit is contamination in the optical system, on the surfaces of the radiation source and the matrix and/or in the intermediate space between the signal transmitter unit and the displaceable element.

In particular, the signal processor is therefore designed to determine a speed and/or a change of position of the displaceable element of the device in relation to the signal transmitter unit in respect of the row direction and in respect of the column direction of the matrix in each case as a determination result, wherein the device has a test component which is designed to determine, from a comparison of the determination results in respect of the row direction and in respect of the column direction, whether the signal transmitter unit delivers plausible results.

According to a further possibility for checking the correct function of the signal transmitter unit, the radiation intensity of the radiation source is varied for test purposes, wherein a test component of the device determines, from a comparison of detection results of the matrix at different radiation intensities, whether the signal transmitter unit delivers plausible results.

In particular, the radiation intensity is temporarily reduced to zero, preferably if no relative displacement takes place between the signal transmitter unit and the displaceable element, or if the control unit predefines no relative displacement. Furthermore, it is preferably determined whether images of the surface of the displaceable element recorded by the matrix differ from one another before and after the reduction in the radiation intensity (or alternatively or additionally before and after the renewed increase in the radiation intensity). If no difference in the images is determined, or if the difference is too small according to a predefined criterion, this indicates a fault in the transmission of the detector signals from the matrix to the signal processor or a fault in the signal processor. Alternatively, the radiation intensity may not be reduced to zero, but to a smaller value than for normal operation. In this case also, differences must occur in the images before and after the change in radiation intensity. For example, the two images can be evaluated in terms of brightness contrasts recognizable therein and a fault can be inferred if the same or even greater brightness contrasts are determined at a lower radiation intensity.

According to a further possibility for checking the correct function of the signal transmitter unit, a measure for an information content from a surface area of the displaceable element, said surface area being mapped by the matrix, is determined from detection results of the matrix, wherein a test component of the device determines, from the measure for the information content and from at least one comparison value, whether the signal transmitter unit delivers plausible results.

The "test component of the device" (this refers to one, more or all of the aforementioned cases) is, in particular, a test component of the signal transmitter unit and is preferably implemented by the signal processor of the signal transmitter unit.

In particular, the number of visible structures in the image can be determined, e.g. by identifying and then counting the structures through differentiation of pixels with a background color and/or pixels of a different color which indicate a different structure. Another possibility consists in determining the brightness contrasts and/or color contrasts between adjacent pixels in the image.

The following design enables a predefined relative position between the signal transmitter unit and the displaceable element to be reliably recognized. In particular, the displaceable element has a surface design that is characteristic of the predefined relative position at a predefined position relative to the signal transmitter unit for this purpose. Furthermore, the signal processor, the monitoring component or a different component of the device is/are designed to recognize the predefined relative position if the characteristic surface design is detected by the matrix of the signal transmitter unit. In particular, a predefined structure may be present at the predefined relative position, wherein a three-dimensional structure or a two-dimensional structure may be involved. For example, a layer (e.g. a film) may be applied to the actual surface of the element, said film showing an image which is the predefined structure. In particular, it is also possible for the displaceable element to have a characteristic surface design in each case at different locations on its surface, wherein the designs at the different locations preferably differ from one another in order to be able to distinguish the locations and therefore the positions from one another.

In particular, the signal processor may have a first signal output via which the signal processor outputs information relating to the position, change of position and/or speed, in particular to the control unit of the device, during normal operation. The signal processor may optionally have at least one additional output which outputs the result of a plausibility check carried out by it (see above) and/or signals the reaching of the predefined relative position. This has the advantage that a different component of the device, in particular the control unit of the device, can respond immediately, without a substantial requirement for further processing of the information, to implausible signals and/or to the reaching of a predefined position (i.e. the relative position between the signal transmitter unit and the displaceable element). For example, the predefined relative position is a so-called safety position which the device is intended to reach in an operating mode. As soon as the signal processor signals the reaching of this safety position, the drive of the device can be switched off, for example, and/or further measures can be instigated for which the reaching of the safety position is a prerequisite.

BRIEF DESCRIPTION OF THE SEVERAL VIEWS OF THE DRAWING

Example embodiments of the invention will now be described with reference to the attached drawing. In the individual figures of the drawing.

DESCRIPTION OF THE INVENTION

Figure 1:
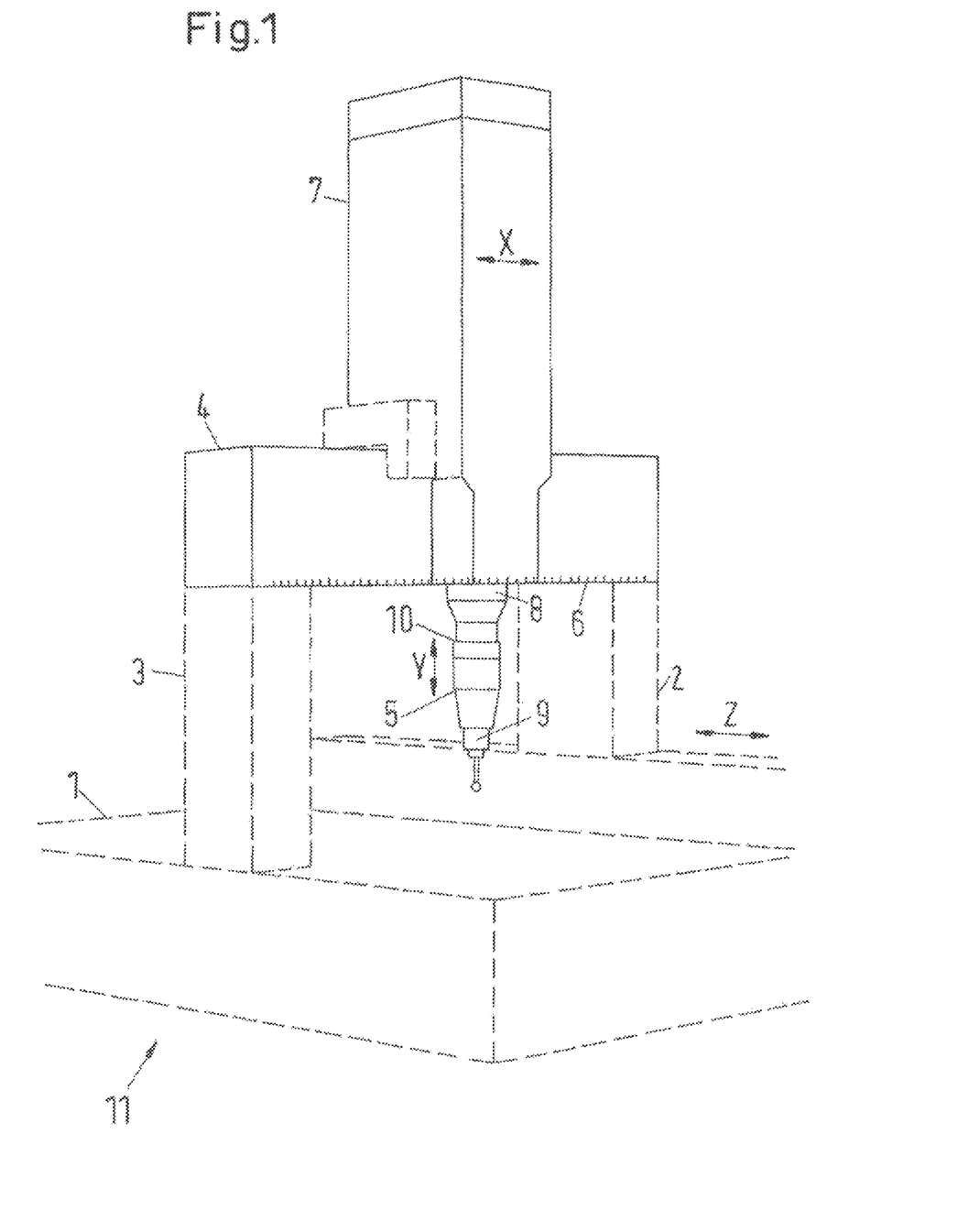
FIG. 1 shows a coordinate measuring device in a portal design.

The coordinate measuring device (CMD) 11 in a portal design shown in FIG. 1 has a measuring table 1 above which pillars 2, 3 are disposed displaceably in the Z-direction of a Cartesian coordinate system. The pillars 2, 3, together with a crossbeam 4, form a portal of the CMD 11. The crossbeam 4 is connected at its opposite ends to the pillars 2 and 3. Electric motors (drives) not shown in detail cause the linear displacement of the pillars 2, 3, in the Z-direction. An electric motor is allocated to each of the two pillars 2, 3.

The crossbeam 4 is combined with a cross slide 7 which is displaceable in an air-cushioned manner along the crossbeam 4 in the X-direction of the Cartesian coordinate system. The instantaneous position of the cross slide 7 in relation to the crossbeam 4 can be determined with reference to a scale division 6. The displacement of the crossbeam 4 in the X-direction is driven by a further electric motor.

A sleeve 8 displaceable in a vertical direction which is connected at its lower end via a mounting component 10 to a coordinate measuring component 5 is mounted on the cross slide 7. A measuring head 9 from which a stylus in turn projects downward is removably disposed on the coordinate measuring component 5. The coordinate measuring component 5, driven by a further electric motor, can be displaced in relation to the cross slide 7 in the Y-direction of the Cartesian coordinate system. The measuring head 9 can therefore be moved by the four electric motors in total to each point below the crossbeam 4 and above the measuring table 1 which is located in the intermediate space defined by the pillars 2, 3.

Figure 2:
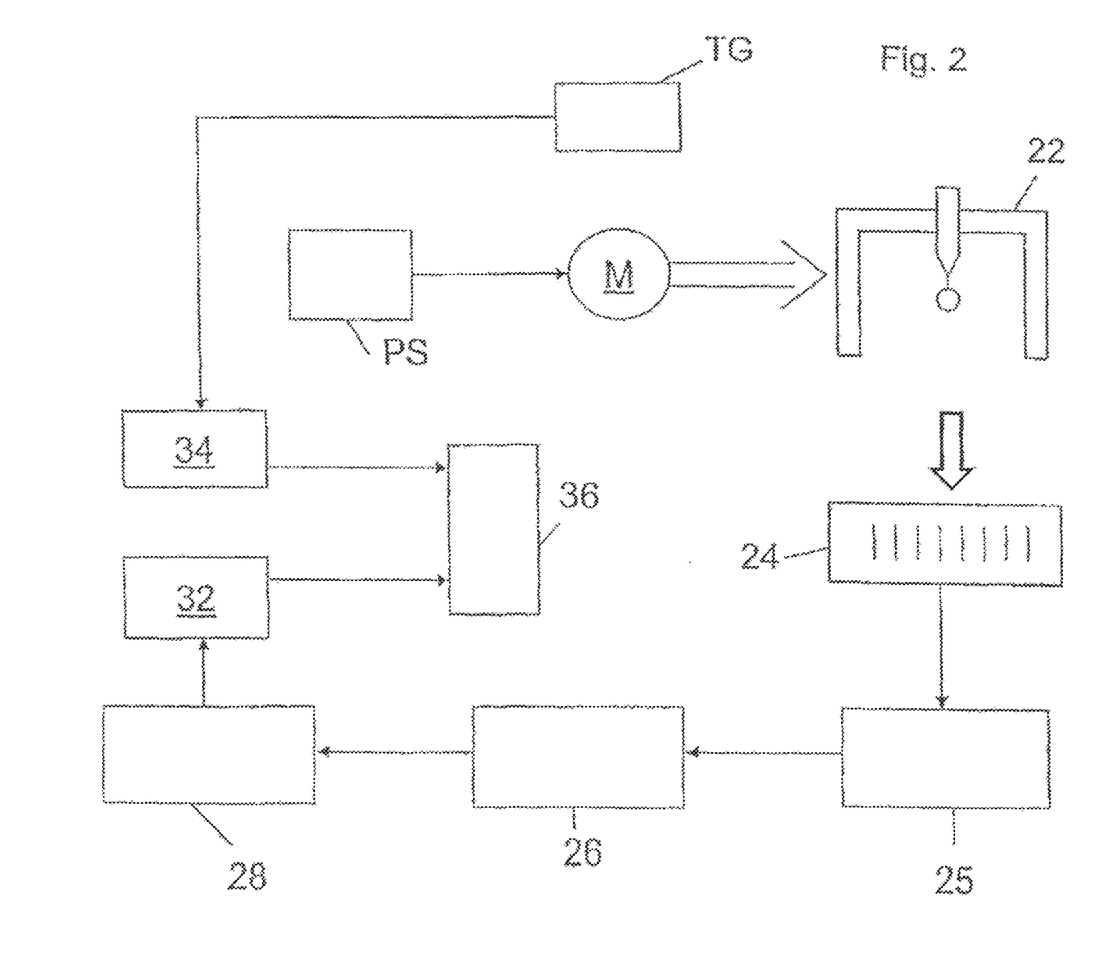
FIG. 2 shows schematically an arrangement of units of a device with a displaceable device part to explain a redundant determination and processing of information relating to the displacement of the device part.

FIG. 2 shows schematically a measuring component 22 which can be displaced in order to determine coordinates of a measurement object through definition of a position of the measuring component 22 (e.g. the position of a scanning element). In the present example embodiment, the measuring component 22 is displaceable in relation to three linear axes that are independent from one another. Each of the three linear axes has an incremental scale 24. The definition of the position of the measuring component 22 with reference to an incremental scale of this type is known per se from the prior art (e.g. magnetic or photo-electrical scanning). For example, the position can be determined as described in DE 43 03 162 using an incremental photoelectric measuring system. A measuring system that can similarly be used to define coordinates or positions is described in WO 87/07944. An interferential measuring principle can be applied.

The reference number 25 in FIG. 2 denotes a corresponding first signal transmitter which generates a position signal according to the current position of the measuring component 22 using the incremental scale 24, said position signal being further processed by a downstream interpolator 26. For the positions between the markings of the incremental scale 24, the interpolator 26 also delivers valid values which can be used by a downstream coordinate determination component 28.

The coordinates (which are defined in particular in the coordinate system of the incremental scales 24) determined by the coordinate determination component 28 are fed to a determination component 32 for determining the speed of a displaceable part of the CMD in relation to the linear axis. The speed is determined, in particular, through formation of the temporal derivation of the individual coordinates with time.

Furthermore, FIG. 2 shows one of a plurality of drive motors M which displace the measuring component 22. A power stage PS is provided to control the motor M. Furthermore, a second signal transmitter TG is provided for at least one and preferably for each of the three linear axes as part of a signal transmitter unit which similarly delivers information relating to the state of displacement in relation to the linear axis depending on the first signal transmitter.

The detector signals of the signal transmitter TG are fed to the signal processor 34 of the signal transmitter unit which determines the speed of a displaceable part of the CMD in relation to the linear axis and optionally further information from the detector signals.

At least the speed values determined by the determination component 32 and by the signal processor 34 are fed to the central control unit 36 of the CMD which also controls the displacement of all drives of the CMD, in particular by controlling the power stage PS.

Through evaluation of the speed values and optionally the further information from the signal processor 34, the control unit 36 can determine whether an error of the device occurs and/or whether a disruption to the operation occurs. To do this, the control unit 36 checks in particular whether a predefined criterion is met. For example, it can be established whether one of the determined speed values is too high, for example because it exceeds a maximum permissible value. Alternatively or additionally, it can be determined whether the two speed values deviate from one another by more than a predefined permissible difference and/or at least one of the two speed values deviates from an expected value. Furthermore, the control unit 36 can evaluate the further information according to at least one predefined criterion, for example whether a predefined position in relation to the linear axis is reached and/or whether the measurement signals generated by the signal transmitter unit are plausible. If the predefined criterion or one of the predefined criteria is met, the control unit 36 can, in particular, trigger a safeguard measure. It is possible that at least one safeguard measure is already allocated in each case in advance to the criteria.

The functions described above of the determination component 32, the signal processor 34 and the control unit 36 can also be implemented in other designs of devices with displaceable device parts.

Figure 3:
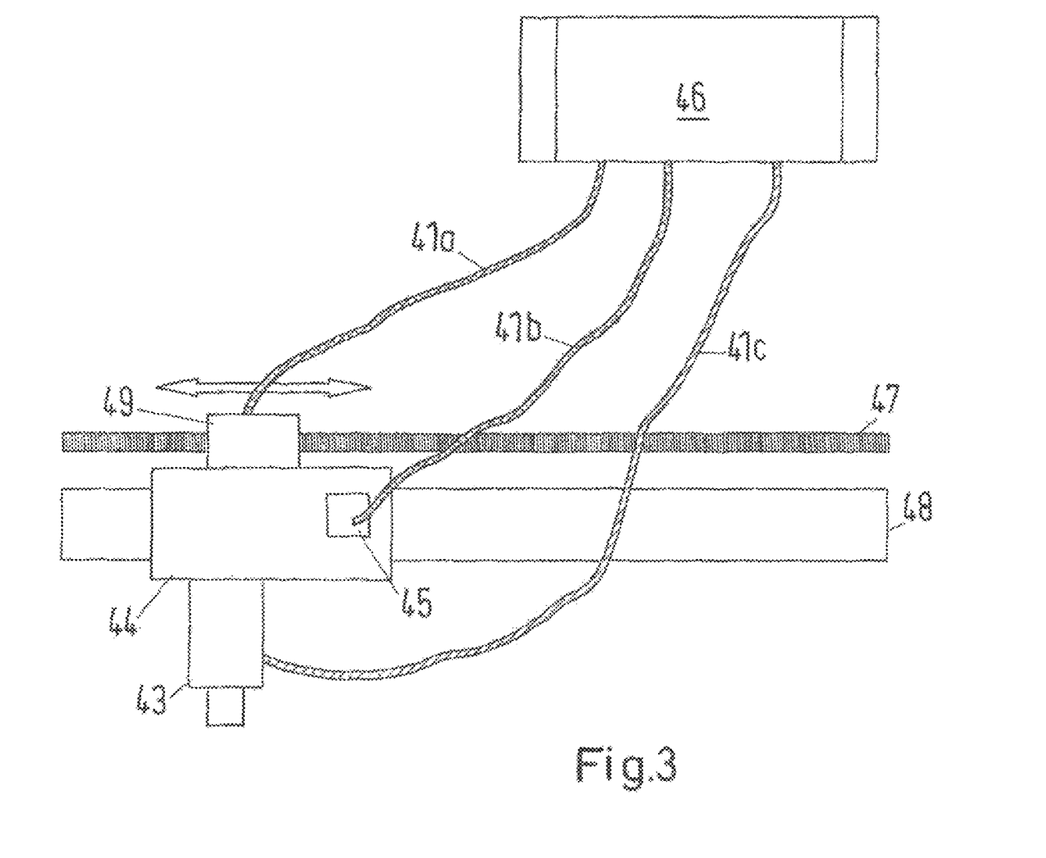
FIG. 3 shows a displaceable part of a device which is displaceable in relation to a different part of the device along a linear axis (i.e. in a straight line), wherein a first signal transmitter and a second signal transmitter which is part of a signal transmitter unit or forms the latter are attached to the displaceable part.

FIG. 3 shows a displaceable part 44 of a device, e.g. the CMD shown in FIG. 1, which is displaceable in a straight line along a displacement guide 48. The corresponding linear axis runs from right to left in FIG. 3. A scale 47, in particular an incremental scale, is shown above the guide 48. A first signal transmitter 49 attached to the displaceable part 44 is moved along the scale 47 when the displaceable part 44 is displaced and supplies information on the instantaneous relative position of the scale 47 and the displaceable part 44 in relation to the linear axis. For example, the position and speed can be determined from the values of a first signal transmitter 49 designed as an incremental signal transmitter. The signals of the first signal transmitter 49 are transmitted via a signal line 41a to a control unit 46. The original detector signals of the signal transmitter 49 or signals that have already been further processed can be transmitted here.

Furthermore, a second signal transmitter 45 which is designed as an integral signal transmitter unit is connected to the displaceable part 44. A matrix of detector elements of the second signal transmitter 45 is aligned with the surface of the guide 48. In the instantaneous displacement position of the displaceable part 44 in relation to the guide 48, the matrix generates at least one image of a surface area of the guide 48 located opposite it. Since the surface of the guide 48 is structured and, in particular, has microstructures which are mapped in images of the matrix, previously known combinations, in particular, the speed of the displacement of the displaceable part 44 in relation to the guide 48 can be determined from the detector signals of the matrix. An example embodiment will also be discussed with reference to FIG. 4 and FIG. 5. The output signals of the signal transmitter unit generated by a signal processor of the second signal transmitter 48 are transmitted via a signal line 41b to the control unit 46. In particular, the control unit 46 can function as already explained with reference to FIG. 2.

Figure 4:
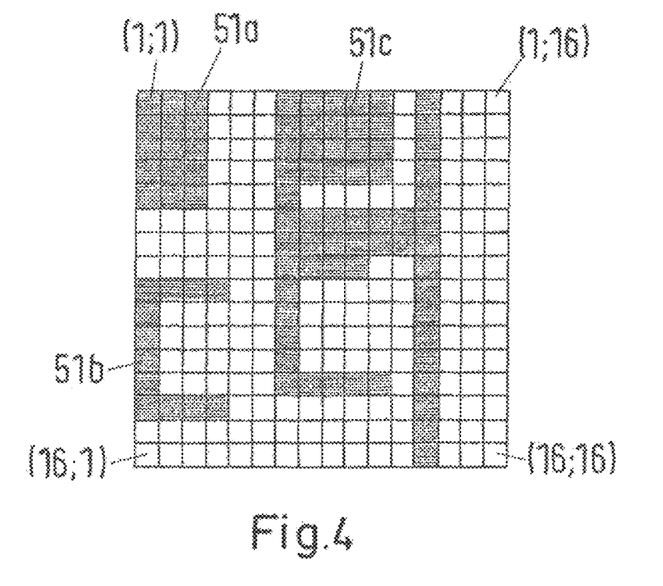
FIG. 4 shows an image of the surface of an element displaceable in relation to the signal transmitter unit generated by a matrix of detector elements of the signal transmitter unit at a given time.

Furthermore, FIG. 3 shows a drive motor 43 of the displaceable part 44 which drives the displacement of the displaceable part 44 along the linear axis. The drive motor 43 is controlled by the control unit 46 via a control line 41c. The image shown in FIG. 4 consists of 16×16 pixels corresponding to 16×16 detector elements of a matrix of detector elements which are parts of a signal transmitter unit with a radiation source and a signal processor. The position of the individual pixels and therefore correspondingly also the position of the detector element of the matrix which supplied the image value (e.g. the greyscale value or color value) of the pixel through its detector signal can, as shown in FIG. 4, be uniquely designated by two coordinates, wherein the first coordinate designates the position of the row of the pixel and the second coordinate located to the right designates the column of the pixel. For example, the pixel in the eighth row and fifteenth column is designated by the coordinates (8; 15).

The image presented in FIG. 4 shows structures of the surface of the element which is displaceable in relation to the signal transmitter unit. For example, a first structure 51a which is rectangular is located on the top left of the image. A C-shaped structure 51b is located below it. A complex-shaped large structure, the right-hand linear structure of which extends over the entire length of the column 13, is located on the right next to the structures 51a, 51b. The left part of this large structure 51c is roughly E-shaped.

Figure 5:
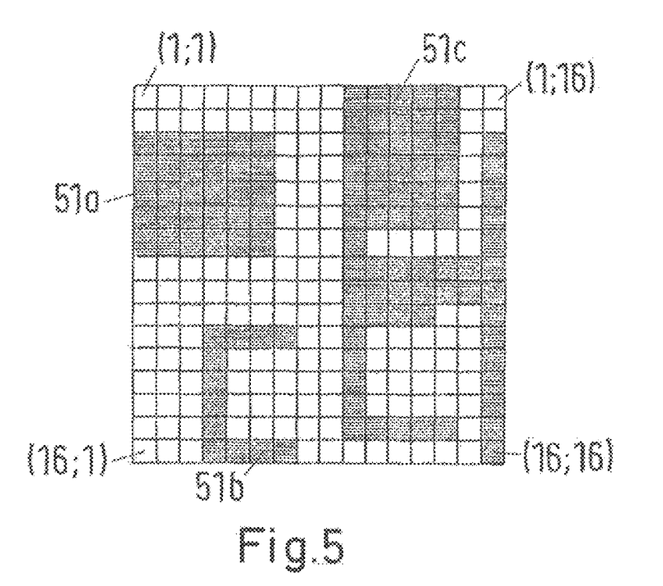
FIG. 5 shows an image as in FIG. 4, wherein the image in FIG. 5 was recorded by the matrix at a later time.

FIG. 5 shows a subsequently recorded image of the surface of the element displaceable in relation to the signal transmitter unit. The structures 51a, 51b, 51c are also shown in the image in FIG. 5, albeit modified in partial areas, since additional areas of the structure 51a, 51c are captured by the image. Furthermore, the lower area of the right-hand part of the structure 51c is not shown in FIG. 5. The displacement of the structures and therefore also the change of position of the matrix of the signal transmitter unit in relation to the displaceable element of the device are determined through comparison of the positions of the structures 51 in the images shown in FIG. 4 and FIG. 5. The speed can be determined therefrom by taking account of the time difference between the two image recordings. Alternatively, the speed can be determined not only by taking account of two, in particular immediately consecutively recorded images of the surface of the element, but also through evaluation of a plurality or multiplicity of consecutive images. In this case, the speed is equal to the temporal derivation of the position.

In the case shown in FIGS. 4 and 5, the structures 51 have been displaced by two rows downward and by three columns to the right. If it is known (e.g. through previous calibration) to which dimension on the surface of the element displaceable in relation to the signal transmitter unit a pixel or the entire recorded image corresponds, the absolute speed and/or absolute change of position along the linear axis can also be determined.

In the case of the images in FIG. 4 and FIG. 5, the matrix of detector elements is not aligned with either its row direction or its column direction in the direction of the linear axis, i.e. in the direction of displacement. Instead, the matrix is aligned in such a way that the parallel projection of the linear axis runs diagonally from top left to bottom right (i.e. through the pixels 1; 1 and 16; 16). For this reason, the structures 51 have essentially moved in this direction if the difference between the images in FIG. 4 and FIG. 5 is considered. Deviations by one pixel are due to the image resolution. However, if greater differences occur (in particular according to a predefined criterion) in the displacement of the structures 51 in the row direction and column direction, an error of the signal transmitter unit can be inferred.

In particular, this "optical flow" of the structures is recorded at a clock rate in the kilohertz range, so that amounts of displacement speeds in the range from 0-1 m/s are measurable with conventional detector matrices in the range from 15-30 detector elements per row and column. Displacements in the reverse direction are obviously recognizable, i.e. the sign of the speed is definable.

The evaluation of the images supplied by the matrix and, in particular, the calculation of the speed are carried out by the signal processor of the signal transmitter unit. As well as an evaluation of greyscale values, an evaluation of color values can also be alternatively or additionally carried out.

Figure 6:
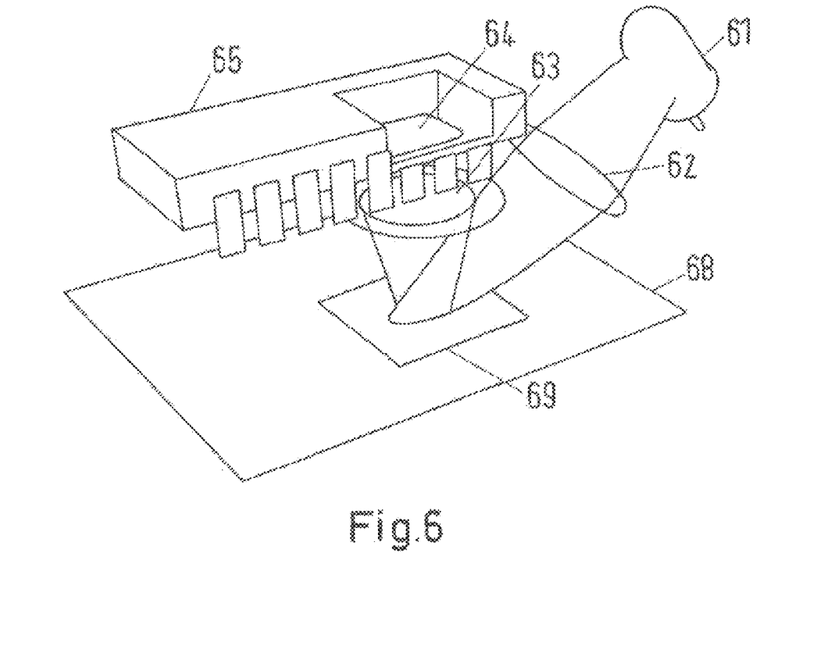
FIG. 6 shows a simplified representation of an arrangement with a radiation source, an optical system, a detector matrix and a signal processor which are parts of a common signal transmitter unit, and with a surface area of an element displaceable in relation to the signal transmitter unit.

A schematically represented example of the arrangement of parts of the signal transmitter unit and the surface of the relatively displaceable element is shown in FIG. 6. However, the connection of the parts of the signal transmitter unit to the structural unit is not shown in FIG. 6.

Light from the radiation source (e.g. an LED) shown on the top right in FIG. 6 is guided by a first optical lens 62 or a corresponding lens system and/or reflector system 62 onto the area 69 of the surface 58 to be scanned and is reflected by the latter in the direction of a second optical lens or a lens system and/or reflector system 63, wherein the reflected radiation is dependent on the optical characteristics of the surface in the area 69 to be scanned. An image of the area 69 to be observed is produced in this way. Due to the effect of the optical lens or the optical system 63, the image is recorded by the matrix 64 of detector elements and their detector signals are fed to the signal processor 65. The data processor by means of which the signal processor 65 is implemented can also perform the function of controlling the radiation intensity at which the radiation source 61 radiates radiation onto the surface area 69 to be scanned.

Figure 7:
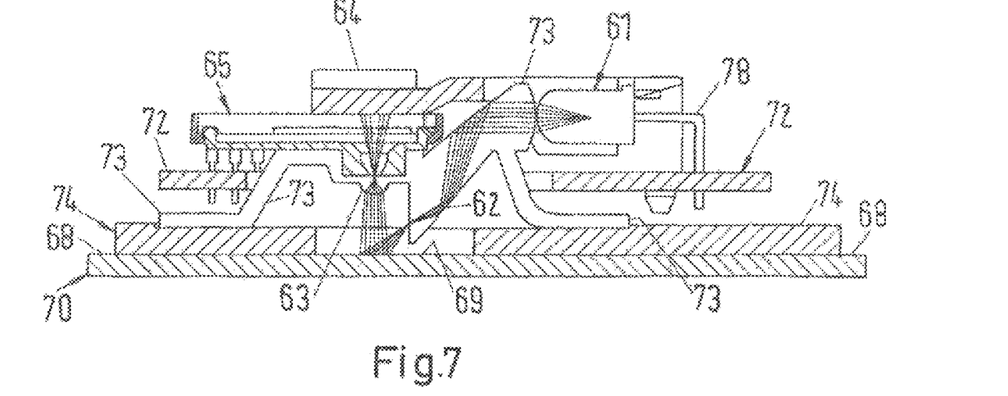
FIG. 7 shows a longitudinal section through a specific example embodiment of the arrangement shown in FIG. 6.

The longitudinal section, shown in FIG. 7, through a specific example embodiment of the arrangement shown in FIG. 6 shows in the lower part the displaceable element 70 with the surface 68 which has the surface area 69 to be observed. In practice, a base area 74 of the signal transmitter unit is preferably arranged at a distance of e.g. a few tenths of a millimeter from the surface 68 so that a relative displacement between the base 74 and the element 70 can take place in a friction-free manner. Alternatively, the surface of the base 74 facing toward the surface 68 can be formed by a material which enables a low-friction and largely abrasion-free sliding over the surface 68.

The term "base" is not to be understood to mean that the base of the signal transmitter unit must be located below. The location indicators "above" and "below" merely refer to the representation in FIG. 7.

A light-conducting body 73 made from a transparent material is shown above the base 74 in FIG. 7, wherein partial areas of the transparent body 73 perform the functions of the optical system. A board 72, e.g. a so-called PCB (Printed Circuit Board), extends on a partial area of the height level over which the transparent body 73 extends. The board 72 at least partially bears the weight of the electrical components of the unit, wherein the electrical connections of the electrical components are preferably implemented completely via the board 72. In particular, the board 72 has a recess through which the areas of the transparent body 73 extend so that the radiation generated by the radiation source 61 can be guided through areas of the transparent body 73 onto the surface area 69 to be observed and so that the reflected radiation can pass through the recess and can be guided from a different area of the transparent body 73 onto the matrix.

In the example embodiment, the transparent body 73 is supported at its end areas shown on the right and left in FIG. 7 on the base 74 and this imparts additional stability to the arrangement and/or establishes the connection between the base and further parts of the unit. The data processor 65 which implements the signal processor and preferably the radiation intensity controller is disposed above the board 72. Three of its electrical connections which extend through the board 72 in the left area of FIG. 7 are shown schematically. One electrical connection 78 of the radiation source 61 similarly extends (on the right in FIG. 7) through the board 72. The matrix 64 of detector elements is shown above the data processor 65.

During the operation of the unit, radiation is radiated, as shown by initially spreading beams, from the radiation source 61 onto a first surface of the transparent body 73, which has a lensing effect and diverts the beams so that they initially run parallel to one another. On a further surface of the transparent body 73, this radiation is reflected and guided onto a further reflection surface which results in an increasing focusing of the beams over a narrow width. The narrowly focused radiation then emerges from a pointedly downward-projecting area of the transparent body 73 and hits surface area 69 to be observed. The reflected radiation hits a lenticular area 63 of the transparent body 73 and is guided onto the matrix 64.

Along with a fast definition and output of the actual displacement information (change of position and speed, e.g. in the kilohertz range) by the signal processor, an output of images of the matrix by the signal processor to outside the unit can also take place, preferably at a much lower frequency (e.g. in the 10 Hz range). The image area of the matrix is e.g. 1.5×1.5 mm with a number of detector elements per line and column of 30.

The invention claimed is:

1. A device selected from the group consisting of coordinate measuring devices and machine tools, the device comprising:
a displaceable device part;
a drive for driving said displaceable device part and thereby effecting a displacement of said displaceable device part;
a control unit connected to said drive and controlling said drive;
a first signal transmitter for determining at least one of a position or a speed of said displaceable device part,
a direct connection connecting said first signal transmitter directly to said control unit or an indirect connection connecting said first signal transmitter indirectly via a first signal evaluation device to said control unit so that, during an operation of the device, said control unit receiving information from said first signal transmitter relating to the at least one of the position or the speed of said displaceable device part and controlling said drive depending on the information received;
a second signal transmitter for at least one of checking or redundantly determining the at least one of the position or the speed of said displaceable device part;
a monitoring component configured to recognize at least one of an error of the device or a disruption to the operation of the device, taking account of signals of at least one of said second signal transmitter or information derived from said signals;
a displaceable element;
said second signal transmitter containing a signal transmitter unit having a radiation source, a matrix of radiation-sensitive detector elements and a signal processor for processing detector signals of said radiation-sensitive detector elements, said radiation source configured to radiate radiation onto said displaceable element displaceable in relation to said signal transmitter unit so that said matrix generates the detector signals depending on a relative position of said signal transmitter unit and said displaceable element; and
said monitoring component connected directly or indirectly via at least one further component of the device to said signal processor.

2. The device according to claim 1, wherein:
said signal transmitter unit and said displaceable element are displaceable in a linear direction of displacement in relation to one another;
said matrix of radiation-sensitive detector elements is a two-dimensional matrix which has a matrix plane in which said radiation-sensitive detector elements are disposed one behind the other in a row direction and a column direction of the matrix plane; and
a parallel projection of the linear direction of displacement onto the matrix plane defines a straight line in the matrix plane which intersects the row direction and the column direction at an acute angle.

3. The device according to claim 2,
wherein said signal processor is configured to determine at least one of a speed or a change of position of said displaceable element in relation to said signal transmitter unit in respect of the row direction and in respect of the column direction of said matrix in each case as a determination result; and
further comprising a test component configured to determine, from a comparison of determination results in respect of the row direction and in respect of the column direction, whether said signal transmitter unit delivers plausible results.

4. The device according to claim 1,
wherein said signal transmitter unit is configured to vary a radiation intensity of said radiation source for test purposes; and
further comprising a test component configured to determine, from a comparison of detection results of said matrix at different radiation intensities, whether said signal transmitter unit delivers plausible results.

5. The device according to claim 1,
wherein said signal processor is configured to determine a measure for an information content from a surface area of said displaceable element, said surface area being mapped by said matrix, from detection results of said matrix; and
further comprising a test component configured to determine, from the measure for the information content and from at least one comparison value, whether said signal transmitter unit delivers plausible results.

6. The device according to claim 1, wherein:
said displaceable element has a surface design that is characteristic of a predefined relative position at a predefined position relative to said signal transmitter unit; and
said signal processor, said monitoring component or a different component of the device is configured to recognize the predefined relative position if the surface design is detected by said matrix of said signal transmitter unit.

7. A method for operating a device selected from the group consisting of coordinate measuring devices and machine tools, which comprises the steps of:
detecting at least one of a position or speed of a displaceable device part via a first signal transmitter;
transmitting signals of the first signal transmitter to a control unit and the control unit controlling a drive of the displaceable device part depending on information relating to the at least one of the position or the speed of the displaceable device part received by means of the signals of the first signal transmitter;
detecting at least one of the position or the speed of the displaceable device part by a second signal transmitter;
recognizing at least one of an error of the device or a disruption to an operation of the device by taking into account output signals of at least one of the second signal transmitter or information derived from the output signals;
operating the second signal transmitter as a signal transmitter unit having a radiation source, a matrix of radiation-sensitive detector elements and a signal processor, radiation being generated by the radiation source of the signal transmitter unit and is radiated onto a displaceable element of the device displaceable in relation to the signal transmitter unit, so that the matrix detects a part of generated radiation depending on a relative position of the signal transmitter unit and the displaceable element;
transmitting detector signals of the matrix within the signal transmitter unit to the signal processor which outputs output signals of the second signal transmitter; and
evaluating the output signals of the second signal transmitter and, if applicable, an error of the device and/or a disruption to the operation of the device is recognized by means of an evaluation.

8. The method according to claim 7,
wherein the signal transmitter unit and the displaceable element are displaceable in a linear direction of displacement in relation to one another;
wherein the matrix of radiation-sensitive detector elements is operated as a two-dimensional matrix which has a matrix plane in which the detector elements are disposed one behind the other in a row direction and a column direction of the matrix plane; and
wherein a parallel projection of the linear direction of displacement onto the matrix plane defines a straight line in the matrix plane which intersects the row direction and the column direction at an acute angle.

9. The method according to claim 8, which further comprises:
determining, via the signal processor, at least one of a speed or a change of position of the displaceable element in relation to the signal transmitter unit in respect of the row direction and in respect of the column direction of the matrix in each case as a determination result; and
determining, via a test component, from a comparison of determination results in respect of the row direction and in respect of the column direction, whether the signal transmitter unit delivers plausible results.

10. The method according to claim 7, which further comprises
varying, via the signal transmitter unit, a radiation intensity of the radiation source for test purposes; and
determining, via a test component, from a comparison of detection results of the matrix at different radiation intensities, whether the signal transmitter unit delivers plausible results.

11. The method according to claim 7, which further comprises:
determining, via the signal processor, a measure for an information content from a surface area of the displaceable element, the surface area being mapped by the matrix, from detection results of the matrix; and
determining, via a test component, from the measure for the information content and from at least one comparison value, whether the signal transmitter unit delivers plausible results.

12. The method according to claim 7, wherein:
the displaceable element has a surface configuration that is characteristic of a predefined relative position at a predefined position relative to the signal transmitter unit; and
the signal processor, the monitoring component or a different component of the device recognizes the predefined relative position if the surface configuration is detected by the matrix of the signal transmitter unit.

* * * * *